(12) United States Patent
Aikawa et al.

(10) Patent No.: US 9,893,569 B2
(45) Date of Patent: Feb. 13, 2018

(54) POWER SUPPLY APPARATUS, POWER SUPPLY METHOD, AND STORAGE MEDIUM

(71) Applicant: CANON KABUSHIKI KAISHA, Tokyo (JP)

(72) Inventors: Iori Aikawa, Yokohama (JP); Marie Tateno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 14/628,006

(22) Filed: Feb. 20, 2015

(65) Prior Publication Data

US 2015/0244180 A1    Aug. 27, 2015

(30) Foreign Application Priority Data

Feb. 24, 2014 (JP) .................... 2014-033279

(51) Int. Cl.
*H02J 7/02* (2016.01)
*H02J 50/80* (2016.01)
*H02J 50/12* (2016.01)
*H04B 5/00* (2006.01)

(52) U.S. Cl.
CPC .............. *H02J 50/80* (2016.02); *H02J 50/12* (2016.02); *H04B 5/0031* (2013.01); *H04B 5/0037* (2013.01); *H02J 7/025* (2013.01)

(58) Field of Classification Search
CPC .. H02J 50/00; H02J 17/00; H02J 5/005; H02J 7/025; H01F 38/14; H01F 27/006; B60L 11/182; B60L 5/005; H04B 5/0037; Y02T 90/122; H02G 7/16
USPC ........................................................ 307/104
See application file for complete search history.

(56) References Cited

U.S. PATENT DOCUMENTS

2013/0033235 A1* 2/2013 Fukaya ................... H02J 17/00
                                                              320/162
2014/0015340 A1* 1/2014 Ito .......................... H02J 5/005
                                                              307/104

FOREIGN PATENT DOCUMENTS

JP           2008-113519 A      5/2008

* cited by examiner

*Primary Examiner* — John Poos
(74) *Attorney, Agent, or Firm* — Canon U.S.A., Inc. IP Division

(57) ABSTRACT

A power supply apparatus includes an output unit that wirelessly outputs electric power to an electronic device, a communication unit that wirelessly communicates with the electronic device, a detecting unit that detect a current flowing to the output unit, and a control unit that performs a process to limit the current flowing to the output unit in a case where the current detected by the detecting unit is greater than or equal to a predetermined value set according to a predetermined magnetic field strength while the output unit outputs the electric power to the electronic device.

16 Claims, 5 Drawing Sheets

POWER SUPPLY APPARATUS, POWER SUPPLY METHOD, AND STORAGE MEDIUM

BACKGROUND

Field

Aspects of the present invention generally relate to a power supply apparatus capable of wireless power supply.

Description of the Related Art

Recently, a wireless power supply system has been known that includes a power supply apparatus configured to wirelessly output electric power without being connected by a connector, and an electronic device configured to charge a battery by electric power wirelessly supplied from the power supply apparatus.

In such a wireless power supply system, Japanese Patent Application Laid-Open No. 2008-113519 discloses a power supply apparatus that alternates between communication for sending a command to an electronic device and transmission of electric power to the electronic device by using the same antenna.

A power supply apparatus conventionally performs a process to intensify a magnetic field generated at an antenna when supplying electric power to an electronic device to charge a battery. Also, the power supply apparatus conventionally performs a process to weaken the magnetic field generated at the antenna when communicating with the electronic device. However, in the case where a communication apparatus is placed in the vicinity of the power supply apparatus while the power supply apparatus supplies electric power to the electronic device, the magnetic field generated at the antenna of the power supply apparatus has not been sufficiently weakened, and often affects communication by the communication apparatus. Such an issue may occur in a power supply apparatus other than a power supply apparatus that performs communication for sending a command to the electronic device and transmission of electric power to the electronic device by using the same antenna.

SUMMARY OF THE INVENTION

An aspect of the present invention generally relates to supplying electric power to an electronic device without affecting communication by other communication apparatus.

According to an aspect of the present invention a power supply apparatus includes an output unit configured to wirelessly output electric power to an electronic device, a communication unit configured to wirelessly communicate with the electronic device, a detecting unit configured to detect a current flowing to the output unit, and a control unit configured to perform a process to restrict a current flowing to the output unit in a case where the current detected by the detecting unit is greater than or equal to a predetermined value set according to a predetermined magnetic field strength while the output unit outputs electric power to the electronic device.

Further aspects of the present disclosure will become apparent from the following description of exemplary embodiments.

DESCRIPTION OF THE EMBODIMENTS

Various exemplary embodiments, features, and aspects of the present disclosure will be described below with reference to the drawings.

First Embodiment

A first embodiment will be hereinafter described with reference to the drawings.

Figure 1:
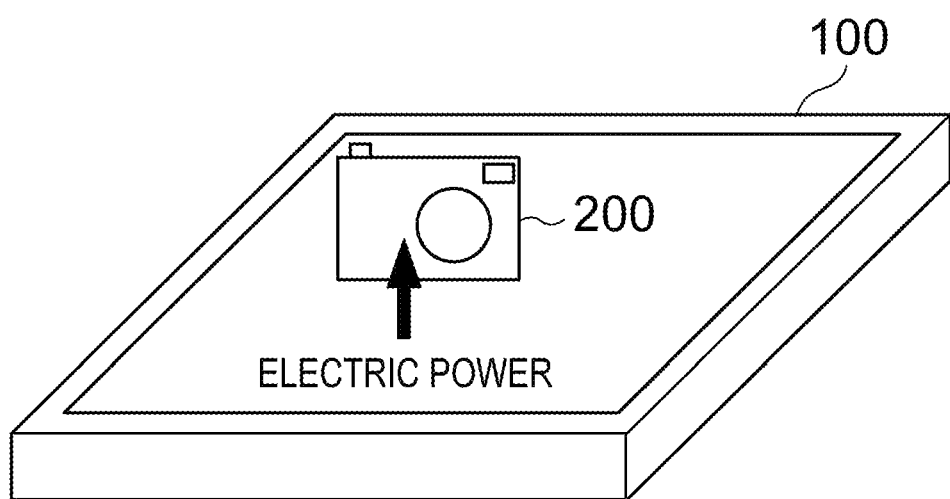
FIG. 1 is a view illustrating an example of a power supply system according to a first and a second embodiment.

A power supply system according to the first embodiment includes a power supply apparatus 100 and an electronic device 200 as illustrated in FIG. 1. The power supply apparatus 100 wirelessly outputs electric power to the electronic device 200. The electronic device 200 wirelessly receives electric power output from the power supply apparatus 100. The power supply apparatus 100 may wirelessly output electric power to multiple apparatuses having a similar function to the electronic device 200.

The electronic device 200 may be a movable object such as a vehicle, an image capture apparatus, a mobile device such as a cellular phone, or a battery pack.

The power supply system according to the first embodiment will be hereinafter described as a system in which the power supply apparatus 100 outputs electric power to the electronic device 200 by electromagnetic field resonance, and the electronic device 200 receives electric power from the power supply apparatus 100 by electromagnetic field resonance. However, any other method than electromagnetic field resonance may be applied to transmit electric power from the power supply apparatus 100 to the electronic device 200.

(Power Supply Apparatus 100)

Figure 2:
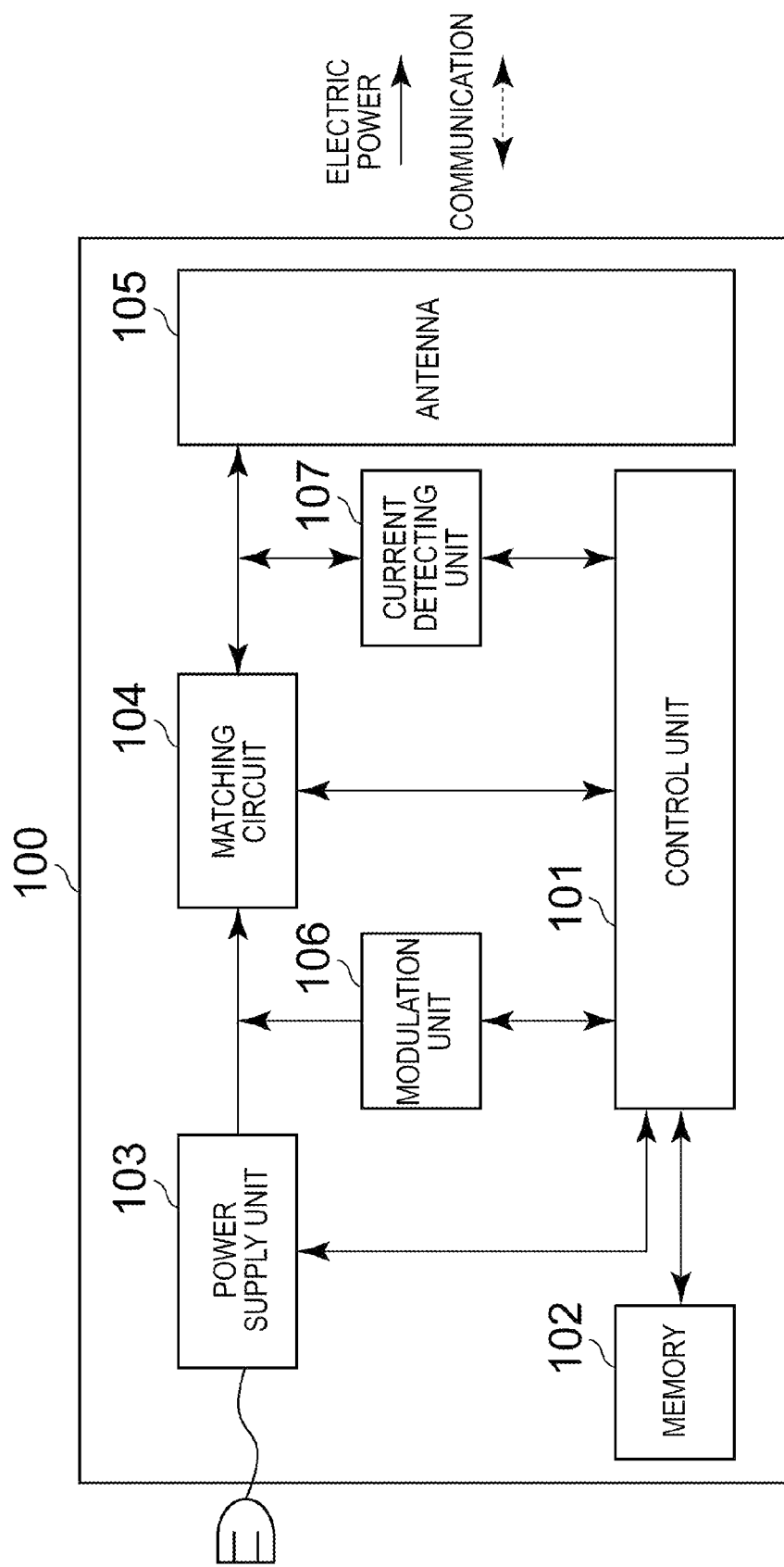
FIG. 2 is a block diagram illustrating an example of the power supply system according to the first and second embodiments.

The power supply apparatus 100 will be described with reference to FIG. 2. As illustrated in FIG. 2, the power supply apparatus 100 includes a control unit 101, a memory 102, a power supply unit 103, a matching circuit 104, an antenna 105, a modulation unit 106, and a current detecting unit 107. A unit including the power supply unit 103, the matching circuit 104, the antenna 105, the modulation unit 106, and the current detecting unit 107 is called "a power feed unit 108". The power feed unit 108 will be described with reference to FIG. 3.

The control unit 101 controls each unit of the power supply apparatus 100 depending on a program stored in the memory 102. The control unit 101 is, for example, a central processing unit (CPU). Also, the control unit 101 includes hardware.

The memory 102 stores a computer program for controlling an operation of each unit of the power supply apparatus 100, information on the operation of each unit, and information received from the electronic device 200.

Figure 3:
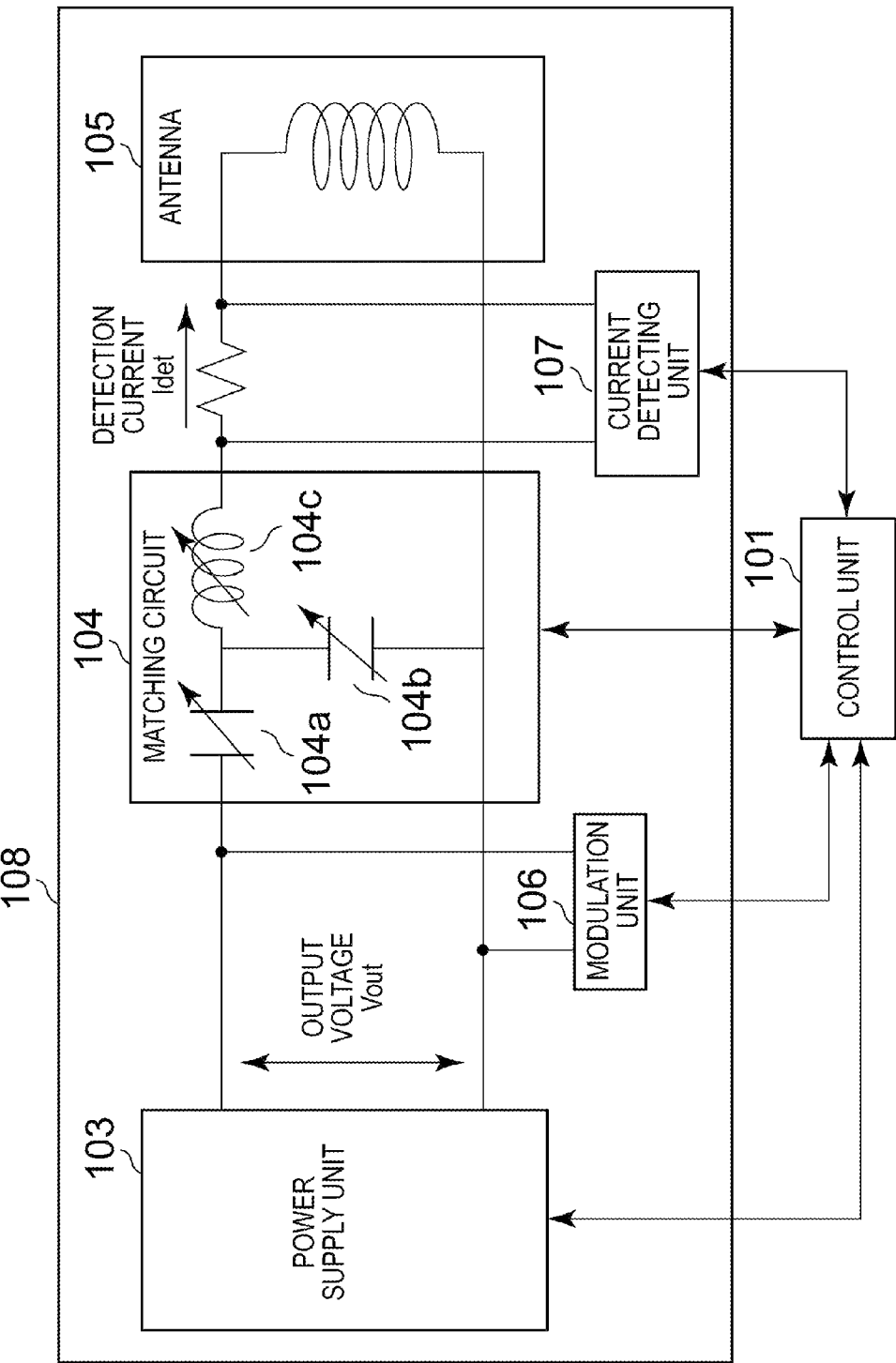
FIG. 3 is a diagram illustrating an exemplary configuration of the power feed unit according to the first and second embodiments.

The power supply unit 103 generates electric power to be output to the outside through the antenna 105 depending on AC power supplied from an AC power source. After that, the power supply unit 103 supplies the generated electric power to the antenna 105 through the matching circuit 104. The power supply unit 103, for example, outputs voltage to the matching circuit 104 as illustrated in FIG. 3. The voltage output from the power supply unit 103 to the matching circuit 104 is hereinafter called "an output voltage Vout".

The matching circuit 104 is a resonance circuit to resonate between the antenna 105 and an antenna of the electronic device 200. The matching circuit 104 includes, for example, variable capacitors 104*a* and 104*b*, and a variable coil 104*c* as illustrated in FIG. 3. The variable capacitor 104*a* and the variable coil 104*c* are connected in series to the antenna 105. The variable capacitor 104*b* is connected in parallel to the antenna 105.

When transmitting electric power through the antenna 105, the control unit 101 controls a value of at least one of the variable capacitors 104*a* and 104*b* and the variable coil 104*c* so that a resonance frequency of the antenna 105 becomes a predetermined frequency.

The predetermined frequency may be 50 to 60 Hz, which is a commercial frequency, 10 to several hundred KHz, or approximately 10 MHz. Also, the predetermined frequency may be 110 to 205 KHz, 13.56 MHz, 6.78 MHz, or 20 to 100 KHz.

The antenna 105 is an antenna to transmit electric power generated by the power supply unit 103 to the electronic device 200. Also, the antenna 105 is used to communicate with the electronic device 200.

The antenna 105 includes, for example, a coil as illustrated in FIG. 3.

The modulation unit 106 wirelessly communicates with the electronic device 200 through the antenna 105 based on a predetermined protocol. The predetermined protocol is, for example, a protocol defined by a near field communication (NFC) standard.

The modulation unit 106 superimposes a command on electric power by performing amplitude shift keying (ASK) modulation on electric power to be supplied from the power supply unit 103 to the matching circuit 104. The electric power, on which the command is superimposed, is sent to the electronic device 200 through the antenna 105. When the electronic device 200 has received the command from the modulation unit 106, the electronic device 200 varies a load in the electronic device 200 to send response data which is a response to the received command. As a result, a current flowing to the antenna 105 changes, and the power supply apparatus 100 receives the response data from the electronic device 200 by demodulating the current.

Next, the current detecting unit 107 will be described with reference to FIG. 3. The current detecting unit 107 detects a current flowing from the matching circuit 104 to the antenna 105 and notifies the control unit 101 of the detected current value. The current detected by the current detecting unit 107 is hereinafter called "a detection current Idet".

The control unit 101 can control a value of a voltage to be supplied from the power supply unit 103 to the matching circuit 104 depending on the current value notified from the current detecting unit 107. Also, depending on the current value notified from the current detecting unit 107, the control unit 101 can control at least one of a capacitance value of the variable capacitor 104*a*, a capacitance value of the variable capacitor 104*b*, and an inductance value of the variable coil 104*c*.

(Power Supply Process)

Next, a power supply process performed by the power supply apparatus 100 will be described by using a flowchart illustrated in FIG. 4. The power supply process illustrated in FIG. 4 can be realized by the control unit 101 executing a computer program stored in the memory 102.

In S401, the control unit 101 determines whether an object exists in the vicinity of the power supply apparatus 100. For example, the control unit 101 determines by using the detection current Idet whether an object exists in the vicinity of the power supply apparatus 100. In the case where an object exists in the vicinity of the power supply apparatus 100 (Yes in S401), the control unit 101 performs S402. In the case where an object does not exist in the vicinity of the power supply apparatus 100 (No in S401), the control unit 101 repeats S401.

In S402, the control unit 101 determines whether authentication to supply electric power is completed. For example, the control unit 101 controls the modulation unit 106 to send an authentication command to request authentication to an object determined to exist in the vicinity of the power supply apparatus 100 in S401. After that, the control unit 101 determines whether the modulation unit 106 has received response data to the authentication command. In the case where the modulation unit 106 has received the response data to the authentication request command, the control unit 101 determines that the object determined to exist in the vicinity of the power supply apparatus 100 in S401 is the electronic device 200, and determines that authentication to supply electric power has been completed (Yes in S402). In such a case (Yes in S402), the control unit 101 performs S403. In the case where the modulation unit 106 has not received the response data to the authentication request, the control unit 101 determines that the object determined to exist in the vicinity of the power supply apparatus 100 in S401 is not the electronic device 200 (No in S402), and performs S412.

In S403, the control unit 101 controls the power feed unit 108 to output, to the electronic device 200 through the antenna 105, electric power necessary for causing the electronic device 200 to perform charging or a specific operation. After that, the control unit 101 performs S404. The electric power necessary for causing the electronic device 200 to perform charging or a specific operation is hereinafter called "supply power".

When supply power has been output from the power supply apparatus 100 to the electronic device 200, other communication apparatus may have been placed in the vicinity of the power supply apparatus. In the case where the other communication apparatus has been placed in the vicinity of the power supply apparatus, a magnetic field generated at the antenna 105 has not yet weakened, and therefore, the magnetic field generated at the antenna 105 has often affected communication by the other communication apparatus. To prevent such an issue, the magnetic field generated at the antenna 105 has needed to be limited so as not to affect the other communication apparatus even when supply power has been output from the power supply apparatus 100 to the electronic device 200. Therefore, the control unit 101 limits the magnetic field generated at the antenna 105 by controlling a current flowing to the antenna 105 so as not to exceed a predetermined current Ipre.

In S404, the control unit 101 determines whether the detection current Idet is equal to or greater than the predetermined current Ipre. The predetermined current Ipre is a current value set based on magnetic field strength assumed to affect communication by other communication apparatus. The magnetic field strength assumed to affect communication by the other communication apparatus is, for example, 6.5 to 12 [A/m]. Also, the predetermined current Ipre is, for example, 130 to 150 [mA]. Also, the predetermined current Ipre is recorded in the memory 102 in advance.

In the case where the detection current Idet is equal to or greater than the predetermined current Ipre (Yes in S404), the control unit 101 performs S413. In the case where the detection current Idet is less than the predetermined current Ipre (No in S404), the control unit 101 performs S405.

In S405, the control unit 101 determines whether a predetermined time has passed since supply power has been output. In the case where the predetermined time has passed since supply power has been output (Yes in S405), the control unit 101 performs S406. In the case where the predetermined time has not passed since supply power has been output (No in S405), the control unit 101 performs S404.

After the predetermined time has passed (Yes in S405), the control unit 101 needs to acquire status information from the electronic device 200 to adjust supply power. Therefore, the control unit 101 starts communication with the electronic device 200 to acquire the status information from the electronic device 200.

In S406, the control unit 101 controls the power feed unit 108 to output, to the electronic device 200 through the antenna 105, electric power necessary to communicate with the electronic device 200. The electric power necessary to communicate with the electronic device 200 is hereinafter called "communication power". While communication power is output from the antenna 105, the modulation unit 106 can send a command to the electronic device 200 and receive response data from the electronic device 200. Communication power is electric power smaller than supply power. For example, in the case where supply power is 2 to 10 W, communication power is equal to or lower than 1 W.

In S406, the control unit 101 controls the power supply unit 103 so that the output voltage Vout becomes a voltage to output communication power. The voltage value to output communication power is hereinafter called "Vcom". In the case where the output voltage Vout is lower than the Vcom, the control unit 101 controls the power supply unit 103 in S406 so that the output voltage Vout becomes the Vcom. In the case where the output voltage Vout is higher than the Vcom, the control unit 101 controls the power supply unit 103 in S406 so that the output voltage Vout becomes the Vcom. The Vcom is a value set so that a current flowing to the antenna 105 is less than the predetermined current Ipre. Also, the Vcom is recorded in the memory 102 in advance.

The control unit 101 performs S407 after S406 is performed.

When communication power is output from the power supply apparatus 100 to the electronic device 200, other communication apparatus may be placed in the vicinity of the power supply apparatus. In the case where the other communication apparatus is placed in the vicinity of the power supply apparatus, a magnetic field generated at the antenna 105 often affects communication performed by the other communication apparatus. To prevent such an issue, even in the case where communication power is output from the power supply apparatus 100 to the electronic device 200, the magnetic field generated at the antenna 105 needs to be limited so as not to affect the other communication apparatus. Therefore, the control unit 101 limits the magnetic field generated at the antenna 105 by controlling a current flowing to the antenna 105 so as not to exceed the predetermined current Ipre.

In S407, the control unit 101 determines as in S404 whether the detection current Idet is equal to or greater than the predetermined current Ipre. In the case where the detection current Idet is equal to or greater than the predetermined current Ipre (Yes in S407), the control unit 101 performs S414. In the case where the detection current Idet is less than the predetermined current Ipre (No in S407), the control unit 101 performs S408.

In S408, the control unit 101 controls the modulation unit 106 to acquire status information from the electronic device 200. The status information includes, for example, information on an operation of the electronic device 200, information on charging state of a battery connected to the electronic device 200, and information on a value of supply power requested from the electronic device 200 to the power supply apparatus 100. After the status information is acquired from the electronic device 200, the control unit 101 performs S409.

In S409, the control unit 101 determines by using the status information acquired in S408 whether to terminate power supply to the electronic device 200. For example, in the case where the status information includes information indicating that the battery connected to the electronic device 200 is fully charged, the control unit 101 determines to terminate power supply to the electronic device 200. Also, in the case where the status information includes information indicating that the battery connected to the electronic device 200 is not fully charged, the control unit 101 determines not to terminate power supply to the electronic device 200.

In the case where the control unit 101 has determined to terminate power supply to the electronic device 200 (Yes in S409), the control unit 101 performs S412. In the case where the control unit 101 has determined not to terminate power supply to the electronic device 200 (No in S409), the control unit 101 performs S410.

In S410, the control unit 101 determines by using the status information acquired in S408 whether the electronic device 200 has requested to increase supply power. In the case where the control unit 101 has determined that the electronic device 200 has requested to increase power supply (Yes in S410), the control unit 101 performs S411. In the case where the control unit 101 has determined that the electronic device 200 has not requested to increase supply power (No in S410), the control unit 101 performs S415.

In S411, in order to increase supply power upon request from the electronic device 200, the control unit 101 controls the power supply unit 103 to raise the output voltage Vout by a first predetermined value from a present value. After that, the control unit 101 goes back to S403 and controls the power feed unit 108 to output supply power to the electronic device 200 with the output voltage Vout controlled as in S411.

In S412, the control unit 101 controls the power feed unit 108 to stop outputting electric power to the electronic device 200. In this case, the flowchart is finished.

In S413, in order to lower a current flowing to the antenna 105 to less than the predetermined current Ipre, the control unit 101 controls the power supply unit 103 to lower the output voltage Vout by the first predetermined value from a present value. After that, the control unit 101 goes back to S404 and again determines whether the detection current Idet is equal to or greater than the predetermined current Ipre.

In S414 as in S413, in order to lower the current flowing to the antenna 105 to less than the predetermined current Ipre, the control unit 101 controls the power supply unit 103 to lower the output voltage Vout by the first predetermined value from a present value. After that, the control unit 101 goes back to S407 and again determines whether the detection current Idet is equal to or greater than the predetermined current Ipre.

In S415, the control unit 101 determines by using the status information acquired in S408 whether the electronic device 200 has requested to lower supply power. In the case where the control unit 101 has determined that the electronic device 200 has requested to lower supply power (Yes in S415), the control unit 101 performs S416. In the case where the control unit 101 has determined that the electronic device 200 has not requested to lower supply power (No in S415), the control unit 101 performs S403.

In S416, in order to lower supply power upon request from the electronic device 200, the control unit 101 controls the power supply unit 103 to lower the output voltage Vout by the first predetermined value from a present value. After that, the control unit 101 goes back to S403 and controls the power feed unit 108 to output supply power to the electronic device 200 with the output voltage Vout controlled as in S416.

In this manner, the power supply apparatus 100 controls the output voltage Vout depending on whether the detection current Idet is equal to or greater than the predetermined current Ipre. The power supply apparatus 100 limits a magnetic field generated at the antenna 105 by limiting the output voltage Vout in the case where the detection current Idet is equal to or greater than the predetermined current Ipre. As a result, when outputting supply power to the electronic device 200, the power supply apparatus 100 can supply electric power to the electronic device 200 while trying not to affect communication by other communication apparatus even if the other communication apparatus is placed in the vicinity of the power supply apparatus 100. Furthermore, the power supply apparatus 100 can communicate with the electronic device 200 while trying not to affect communication by other communication apparatus even if the other communication apparatus is placed in the vicinity of the power supply apparatus 100 when communicating with the electronic device 200.

Figure 4:
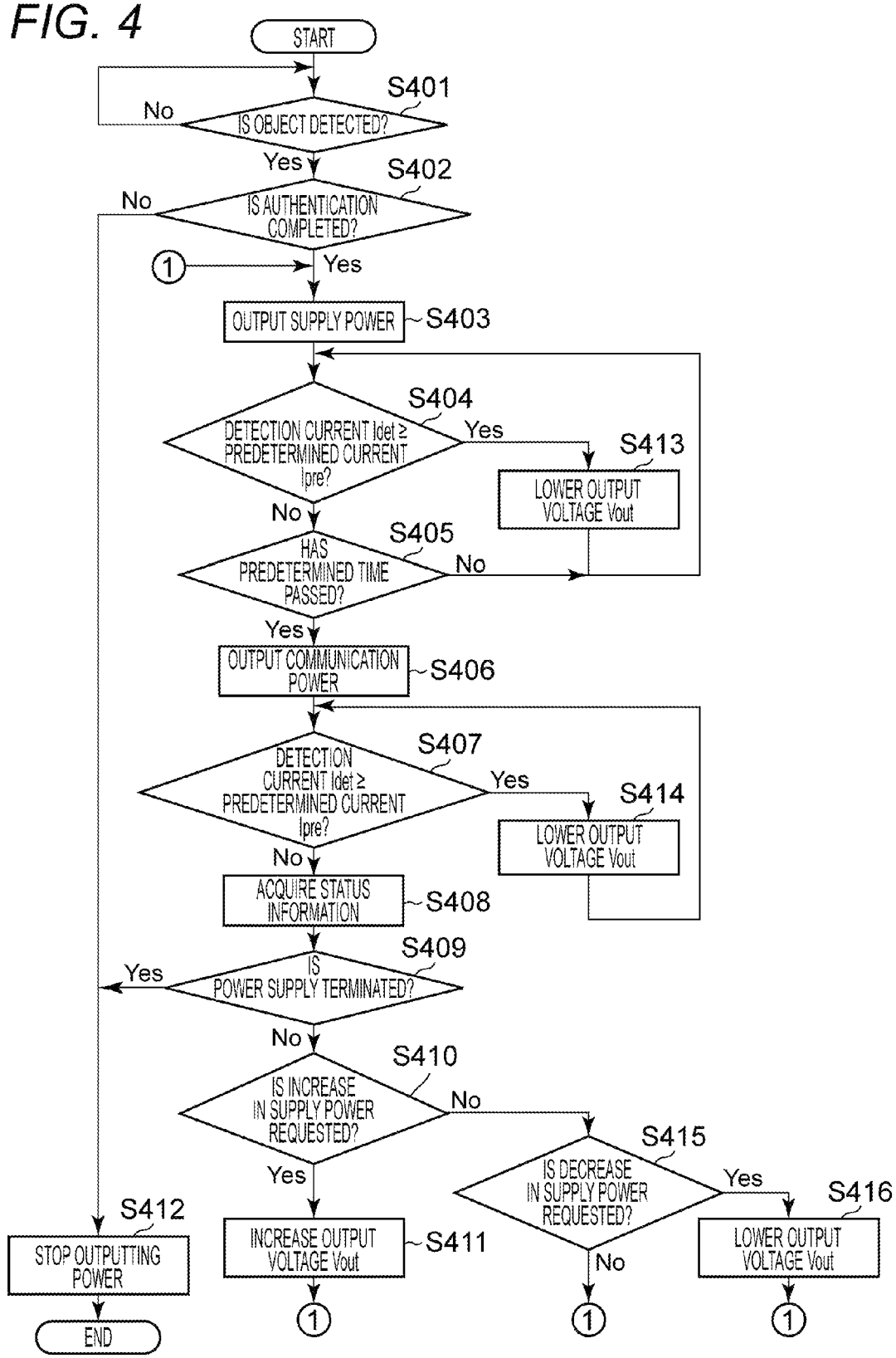
FIG. 4 is a flowchart illustrating an example of a power supply process according to the first embodiment.

In S407 illustrated in FIG. 4, the control unit 101 determines whether the detection current Idet is equal to or greater than the predetermined current Ipre. However, it is not limited to determination as to whether the detection current Idet is equal to or greater than the predetermined current Ipre. In the case where communication power is output from the antenna 105, an effect on other communication apparatus is reduced. Therefore, in S407, the control unit 101 may determine whether the detection current Idet is equal to or greater than a predetermined current Ipre2, which is different from the predetermined current Idet. The predetermined current Ipre2 is a value greater than the predetermined current Ipre. In this case, if the detection current Idet is equal to or greater than the predetermined current Ipre2, the control unit 101 performs S414. If the detection current Idet is less than the predetermined current Ipre2, the control unit 101 performs S408.

Second Embodiment

In a second embodiment, descriptions common to the process and the configuration described in the first embodiment will be omitted. Points different from the process and the configuration described in the first embodiment will be described.

In the first embodiment, the power supply apparatus 100 limits a magnetic field generated at the antenna 105 by lowering the output voltage Vout by the first predetermined value from a present value in the case where the detection current Idet is equal to or greater than the predetermined current Ipre. However, in the second embodiment, the power supply apparatus 100 limits the magnetic field generated at the antenna 105 by controlling a capacitance of the variable capacitor 104b in the case where the detection current Idet is equal to or greater than the predetermined current Ipre.

(Power Supply Process)

Figure 5:
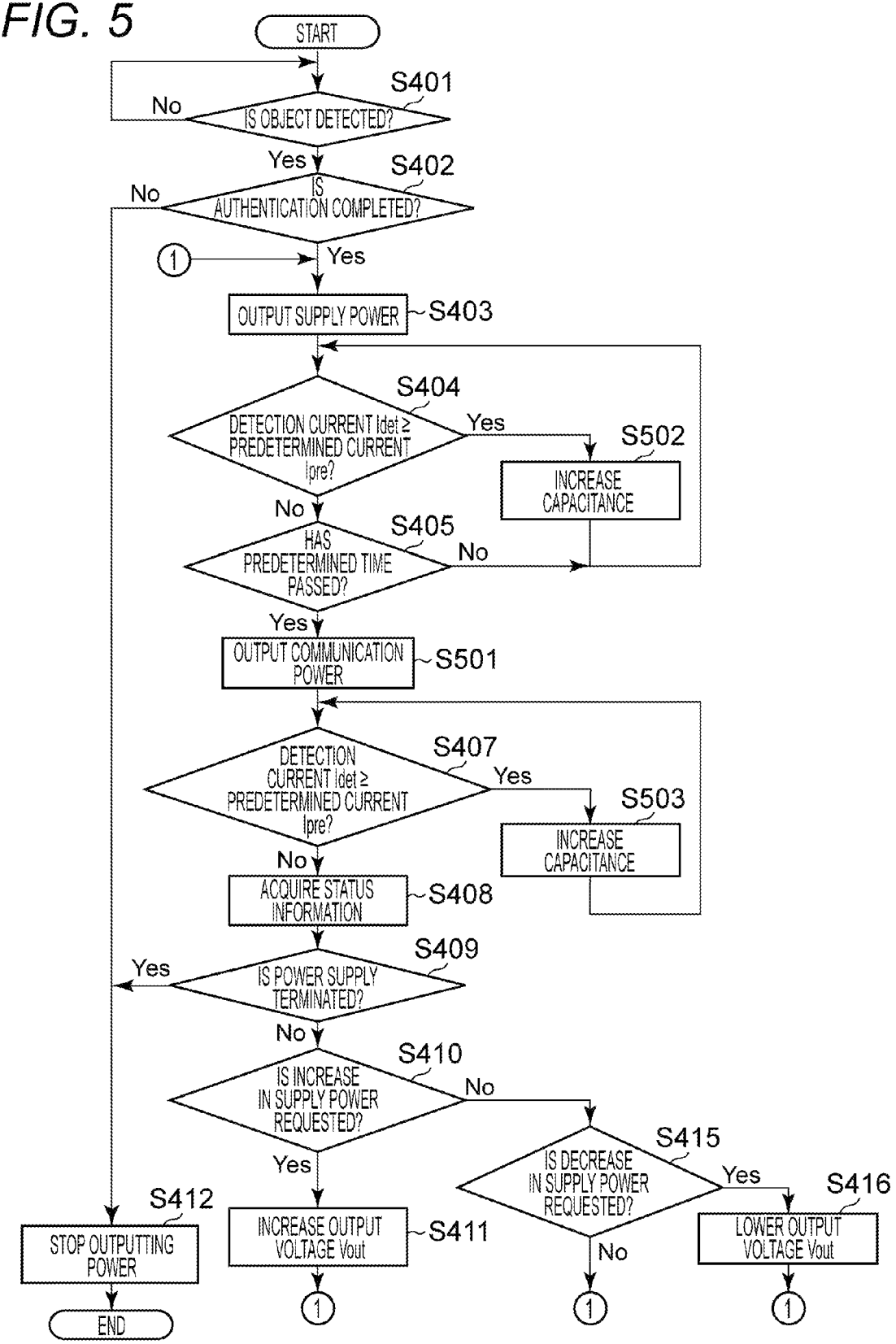
FIG. 5 is a flowchart illustrating an example of a power supply process according to the second embodiment.

With reference to FIG. 5, a power supply process performed by the power supply apparatus 100 in the second embodiment will be described by using a flowchart illustrated in FIG. 5. The power supply process illustrated in FIG. 5 can be realized by the control unit 101 executing a computer program stored in the memory 102. S401 to S405, S407 to S412, S415 and S416 illustrated in FIG. 5 are processes common to S401 to S405, S407 to S412, S415 and S416 illustrated in FIG. 4. Therefore, the processes will not be herein described.

In S405 illustrated in FIG. 5, after a predetermined time has passed (Yes in S405), the control unit 101 performs S501.

In S501, the control unit 101 controls the power supply unit 103 so that the output voltage Vout becomes the Vcom. Furthermore, in S501, the control unit 101 controls the matching circuit 104 so that a capacitance of the matching circuit 104 becomes a capacitance to output communication power. The capacitance to output communication power is hereinafter called "Ccom". In the case where the capacitance of the matching circuit 104 is lower than the Ccom, the control unit 101 controls a capacitance of the variable capacitor 104b in S501 so that the capacitance of the matching circuit 104 becomes the Ccom. In the case where the capacitance of the matching circuit 104 is higher than the Ccom, the control unit 101 controls the capacitance of the variable capacitor 104b in S501 so that the capacitance of the matching circuit 104 becomes the Ccom. The Ccom is a value set so that a current flowing to the antenna 105 is less than the predetermined current Ipre. Also, the Ccom is recorded in the memory 102 in advance.

After S501 is performed, the control unit 101 performs S407.

In the case where the detection current Idet is equal to or greater than the predetermined current Ipre (Yes in S404), the control unit 101 performs S502.

In S502, in order to lower a current flowing to the antenna 105 to less than the predetermined current Ipre, the control unit 101 controls the matching circuit 104 to increase the capacitance of the variable capacitor 104b by a second predetermined value from a present value. After that, the control unit 101 goes back to S404 and again determines whether the detection current Idet is equal to or greater than the predetermined current Ipre. In the case where the capacitance of the variable capacitor 104b is changed in S502, electric power to be supplied from the power supply unit 103 to the antenna 105 decreases. Therefore, the magnetic field generated at the antenna 105 becomes small.

In the case where the detection current Idet is equal to or greater than the predetermined current Ipre (Yes in S407), the control unit 101 performs S503. In S503, in order to lower a current flowing to the antenna 105 to less than the predetermined current Ipre, the control unit 101 controls the matching circuit 104 to increase the capacitance of the variable capacitor 104b by the second predetermined value from a present value. After that, the control unit 101 goes back to S404 and again determines whether the detection current Idet is equal to or greater than the predetermined current Ipre. In the case where the capacitance of the variable capacitor 104b is changed in S503, the electric power supplied from the power supply unit 103 to the antenna 105 decreases. Therefore, the magnetic field generated at the antenna 105 becomes small.

In this manner, the power supply apparatus 100 controls the capacitance of the variable capacitor 104b depending on whether the detection current Idet is equal to or greater than the predetermined current Ipre. The power supply apparatus 100 limits the magnetic field generated at the antenna 105 by controlling the capacitance of the variable capacitor 104b in the case where the detection current Idet is equal to or greater than the predetermined current Ipre. As a result, when outputting supply power to the electronic device 200, the power supply apparatus 100 can supply electric power to the electronic device 200 while trying not to affect communication by other communication apparatus even if the other communication apparatus is placed in the vicinity of the power supply apparatus 100. Furthermore, the power supply apparatus 100 can communicate with the electronic device 200 while trying not to affect communication by other communication apparatus even if the other communication apparatus is placed in the vicinity of the power supply apparatus 100 when communicating with the electronic device 200.

In S407 illustrated in FIG. 5, the control unit 101 determines whether the detection current Idet is equal to or greater than the predetermined current Ipre. However, it is not limited to determination as to whether the detection current Idet is equal to or greater than the predetermined current Ipre. In the case where communication power is output from the antenna 105, an effect on other communication apparatus is reduced. Therefore, in S407, the control unit 101 may determine whether the detection current Idet is equal to or greater than the predetermined current Ipre2. In this case, if the detection current Idet is equal to or greater than the predetermined current Ipre2, the control unit 101 performs S503. If the detection current idet is less than the predetermined current Ipre2, the control unit 101 performs S408.

In the first and second embodiments, the matching circuit 104 includes the variable capacitors 104a and 104b, and the variable coil 104c. However, the configuration of the matching circuit 104 is not limited thereto.

For example, the variable capacitor 104a may be replaced by a first variable coil in the matching circuit 104. Also, the variable capacitor 104b may be replaced by a second variable coil. In such a case, the control unit 101 may lower the detection current Idet to less than the predetermined current Ipre by controlling an inductance of the second variable coil in the case where the detection current Idet is equal to or greater than the predetermined current Ipre.

Also, for example, the matching circuit 104 may not include the variable coil 104c.

In the first and second embodiments, the modulation unit 106 communicates with the electronic device 200 according to a protocol specified in the NFC standard. However, the modulation unit 106 may communicate with the electronic device 200 based on a protocol specified in a radio frequency identification (RFID) instead of the protocol specified in the NFC standard. Also, the modulation unit 106 may communicate with the electronic device 200 based on protocols specified in ISO 14443 and ISO 15693 instead of the protocol specified in the NFC standard. Also, the modulation unit 106 may communicate with the electronic device 200 based on a protocol of other communication.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-033279, filed Feb. 24, 2014, which is hereby incorporated by reference herein in its entirety.

What is claimed is:

1. A power supply apparatus comprising:
   an output unit configured to wirelessly output electric power to an electronic device;
   a detecting unit configured to detect a current flowing to the output unit;
   a control unit configured to perform a process to restrict a current flowing to the output unit in a case where the current detected by the detecting unit is greater than or equal to a predetermined value set according to a predetermined magnetic field strength while the output unit outputs electric power to the electronic device, and
   a resonance unit configured to resonate the output unit and the electronic device, wherein the process includes controlling a capacitance of the resonance unit;
   wherein the resonance unit includes a coil, a first capacitor, and a second capacitor, wherein the coil is connected to the output unit in series, wherein the first capacitor is connected to the output unit in series via the coil, and wherein the second capacitor is connected to the output unit in parallel.

2. The power supply apparatus according to claim 1, further comprising
   a power generating unit configured to generate electric power to be supplied to the output unit, wherein the process includes reducing voltage supplied from the power generating unit to the output unit.

3. The power supply apparatus according to claim 1, wherein
   the resonance unit is used to adjust a resonance frequency of the power supply apparatus.

4. The power supply apparatus according to claim 1, wherein the resonance unit is used to adjust a resonance frequency of the power supply apparatus to a predetermined frequency, and wherein the predetermined frequency is 13.56 [MHz] or 6.78 [MHz].

5. The power supply apparatus according to claim 1, wherein the control unit controls, according to information received from the electronic apparatus by the communication unit, a current flowing to the output unit in a case where the current detected by the detecting unit is less than the predetermined value while the output unit outputs electric power to the electronic device.

6. The power supply apparatus according to claim 1, wherein the output unit communicates with the electronic device, and
a communication protocol of the communication with the electronic device is a near field communication protocol.

7. The power supply apparatus according to claim 1, wherein the output unit communicates with the electronic device, and
a communication protocol of the communication with the electronic device is a radio frequency identification communication protocol.

8. The power supply apparatus according to claim 1, wherein the output unit communicates with the electronic device, and
a communication protocol of the communication with the electronic device is an ISO 14443 or ISO 15693 communication protocol.

9. The power supply apparatus according to claim 1, wherein
the control unit performs a process to restrict a current flowing to the output unit in a case where the current detected by the detecting unit is greater than or equal to a value different from the predetermined value while the power supply apparatus wirelessly communicates with the electronic device.

10. The power supply apparatus according to claim 1, wherein
the control unit controls output of electric power to the electronic device according to information relating to the electronic device received from the electronic device.

11. The power supply apparatus according to claim 1, wherein the predetermined magnetic field strength is greater than or equal to 7.5 [A/m] and less than or equal to 12 [A/m].

12. The power supply apparatus according to claim 1, wherein
the control unit controls the output unit to communicate with the electronic device in a time-division manner.

13. A method for a power supply apparatus having an output unit and a resonance unit, the resonance unit including a coil, a first capacitor, and a second capacitor, wherein the coil is connected to the output unit in series, wherein the first capacitor is connected to the output unit in series via the coil, and wherein the second capacitor is connected to the output unit in parallel, the method comprising:
wirelessly outputting electric power to an electronic device through the output unit;
wirelessly communicating with the electronic device;
detecting a current flowing to the output unit;
performing a process to restrict a detected current flowing to the output unit in a case where the detected current is greater than or equal to a predetermined value set according to a predetermined magnetic field strength while the electric power is output to the electronic device through the output unit; and
resonating the output unit and the electronic device by the resonance unit, wherein the process includes controlling a capacitance of the resonance unit.

14. The method according to claim 13, wherein the process includes reducing voltage supplied to the output unit.

15. The method according to claim 13, further comprising
performing a process to restrict a current flowing to the output unit in a case where the detected current is greater than or equal to a value different from the predetermined value while wirelessly communicating with the electronic device.

16. A non-transitory computer-readable storage medium storing computer executable instructions for causing a power supply apparatus having an output unit and a resonance unit, the resonance unit including a coil, a first capacitor, and a second capacitor, wherein the coil is connected to the output unit in series, wherein the first capacitor is connected to the output unit in series via the coil, and wherein the second capacitor is connected to the output unit in parallel, to perform a method, the method comprising:
wirelessly outputting electric power to an electronic device through the output unit;
wirelessly communicating with the electronic device;
detecting a current flowing to the output unit;
performing a process to restrict a detected current flowing to the output unit in a case where the detected current is greater than or equal to a predetermined value set according to a predetermined magnetic field strength while the electric power is output to the electronic device through the output unit; and
resonating the output unit and the electronic device by the resonance unit, wherein the process includes controlling a capacitance of the resonance unit.

* * * * *